United States Patent
Zhang et al.

(10) Patent No.: US 11,301,510 B2
(45) Date of Patent: Apr. 12, 2022

(54) OBTAINING ITEM LISTINGS MATCHING A DISTINGUISHING STYLE OF AN IMAGE SELECTED IN A USER INTERFACE

(71) Applicant: eBay Inc., San Jose, CA (US)

(72) Inventors: Emily Zhang, Mountain View, CA (US); Roy Leon Camp, Cupertino, CA (US); Chenhao Alex Ma, San Jose, CA (US)

(73) Assignee: eBay Inc., San Jose, CA (US)

( * ) Notice: Subject to any disclaimer, the term of this patent is extended or adjusted under 35 U.S.C. 154(b) by 205 days.

(21) Appl. No.: 16/238,423

(22) Filed: Jan. 2, 2019

(65) Prior Publication Data

US 2019/0138547 A1 May 9, 2019

Related U.S. Application Data

(63) Continuation of application No. 14/754,426, filed on Jun. 29, 2015, now Pat. No. 10,235,388.

(60) Provisional application No. 62/018,308, filed on Jun. 27, 2014.

(51) Int. Cl.
| | |
|---|---|
| *G06Q 30/06* | (2012.01) |
| *G06F 16/583* | (2019.01) |
| *G06F 16/54* | (2019.01) |
| *G06F 16/951* | (2019.01) |

(52) U.S. Cl.
CPC .......... *G06F 16/5838* (2019.01); *G06F 16/54* (2019.01); *G06F 16/951* (2019.01); *G06Q 30/0623* (2013.01)

(58) Field of Classification Search
None
See application file for complete search history.

(56) References Cited

U.S. PATENT DOCUMENTS

| | | | |
|---|---|---|---|
| 8,719,104 B1 * | 5/2014 | Endresen | G06Q 30/0643 705/27.2 |
| 9,773,269 B1 * | 9/2017 | Lazarus | G06F 21/00 |
| 10,235,388 B2 | 3/2019 | Zhang et al. | |
| 2008/0021928 A1 | 1/2008 | Yagnik | |

(Continued)

OTHER PUBLICATIONS

Wenli Zhang and Dan Hu, "Research on customer-oriented shopping guide system of suit-dress with intelligent characteristics," 2009 IEEE 10th International Conference on Computer-Aided Industrial Design & Conceptual Design, 2009, pp. 1979-1982, doi: 10.1109/CAIDCD.2009.5374970. (Year: 2009).*

(Continued)

*Primary Examiner* — Michelle T Kringen
(74) *Attorney, Agent, or Firm* — Shook, Hardy & Bacon L.L.P.

(57) ABSTRACT

In an example embodiment, a selection of an image in a user interface is received. Then information about the image is received. Then a look is identified for the image, wherein the look is a category for the image based at least in part on one or more visual attributes of the image as shown in the image The identified look is then compared with one or more item listings stored in a database to identify one or more matching item listings, the one or more matching item listings containing associated images that correspond to the look. Finally, the one or more matching item listings are displayed in the user interface.

20 Claims, 15 Drawing Sheets

(56) References Cited

U.S. PATENT DOCUMENTS

| | | | |
|---|---|---|---|
| 2008/0144943 A1* | 6/2008 | Gokturk | G06T 7/0002 |
| | | | 382/224 |
| 2008/0152231 A1 | 6/2008 | Gokturk et al. | |
| 2010/0076867 A1* | 3/2010 | Inoue | G06F 16/583 |
| | | | 705/26.1 |
| 2011/0093361 A1* | 4/2011 | Morales | G06Q 30/0603 |
| | | | 705/26.62 |
| 2013/0073420 A1* | 3/2013 | Kumm | G06Q 30/0601 |
| | | | 705/26.5 |
| 2013/0129210 A1* | 5/2013 | Na | G06Q 30/02 |
| | | | 382/165 |
| 2013/0243249 A1* | 9/2013 | You | G06K 9/6202 |
| | | | 382/103 |
| 2013/0315477 A1 | 11/2013 | Murray et al. | |
| 2014/0149257 A1 | 5/2014 | Baca et al. | |
| 2014/0201126 A1* | 7/2014 | Zadeh | A61B 5/165 |
| | | | 706/52 |
| 2015/0100451 A1* | 4/2015 | Ree | G06Q 30/0621 |
| | | | 705/26.5 |
| 2015/0127430 A1 | 5/2015 | Hammer, III | |
| 2015/0379045 A1 | 12/2015 | Zhang et al. | |

OTHER PUBLICATIONS

Non-Final Office Action received for U.S. Appl. No. 14/754,426, dated Jan. 10, 2018, 19 pages.
Notice of Allowance received for U.S. Appl. No. 14/754,426, dated Sep. 12, 2018, 18 pages.
PTO Response to Rule 312 Communication received for U.S. Appl. No. 14/754,426, dated Dec. 31, 2018, 2 pages.
Response to Amendment under Rule 312 for U.S. Appl. No. 14/754,426 dated Dec. 11, 2018, 6 pages.
Response to Non-Final Office Action filed on Apr. 4, 2018, for U.S. Appl. No. 14/754,426, dated Jan. 10, 2018, 22 Pages.
Applicant Initiated Interview Summary Received for U.S. Appl. No. 14/754,426 dated Apr. 5, 2018, 3 pages.
Kalantidis et al., "Getting the Look: Clothing Recognition and Segmentation for Automatic Product Suggestions in Everyday Photos", Proceeding ICMR '13 Proceedings of the 3rd ACM conference on International conference on multimedia retrieval, Apr. 16-20, 2013, 8 pages.

* cited by examiner

OBTAINING ITEM LISTINGS MATCHING A DISTINGUISHING STYLE OF AN IMAGE SELECTED IN A USER INTERFACE

RELATED APPLICATIONS

This application claims the benefit of U.S. application Ser. No. 14/754,426, filed Jun. 29, 2015, which itself claims the benefit of U.S. Provisional Application No. 62/018,308, filed Jun. 27, 2014. The contents of both of which are hereby incorporated by reference in their entirety.

TECHNICAL FIELD

This application relates generally to solving problems encountered when using computer technology to display items in a user interface. More particularly, this application relates to providing a user interface that organizes user interface items based on a look rather than an individual item or category.

BACKGROUND

Ecommerce systems typically sell hundred, thousands, or even millions of items to users. In light of so many choices, it can be difficult for a user to locate items that may interest him or herself. Browsing through items, which involves looking through numerous items without a specific search specified, can be especially challenging in the online world. When a search is performed, a user usually enters a search query in the form of a text search and/or by specifying one or more filters. The results are typically organized by one or more factors, such as relevance, category, date added, etc. When performing a pure browsing function, however, this organization can be more difficult to obtain in a manner that provides relevant results.

BRIEF DESCRIPTION OF THE DRAWINGS

Various ones of the appended drawings merely illustrate example embodiments of the present disclosure and cannot be considered as limiting its scope.

FIG. 3 is a screen capture illustrating a first screen of a user interface in accordance with an example embodiment.

FIG. 9 is a screen capture illustrating a second screen of a user interface in accordance with another example embodiment.

FIG. 10 is a screen capture illustrating an item page in accordance with another example embodiment.

FIG. 12 is a screen capture illustrating a final payment page in accordance with another example embodiment.

Figure 1:
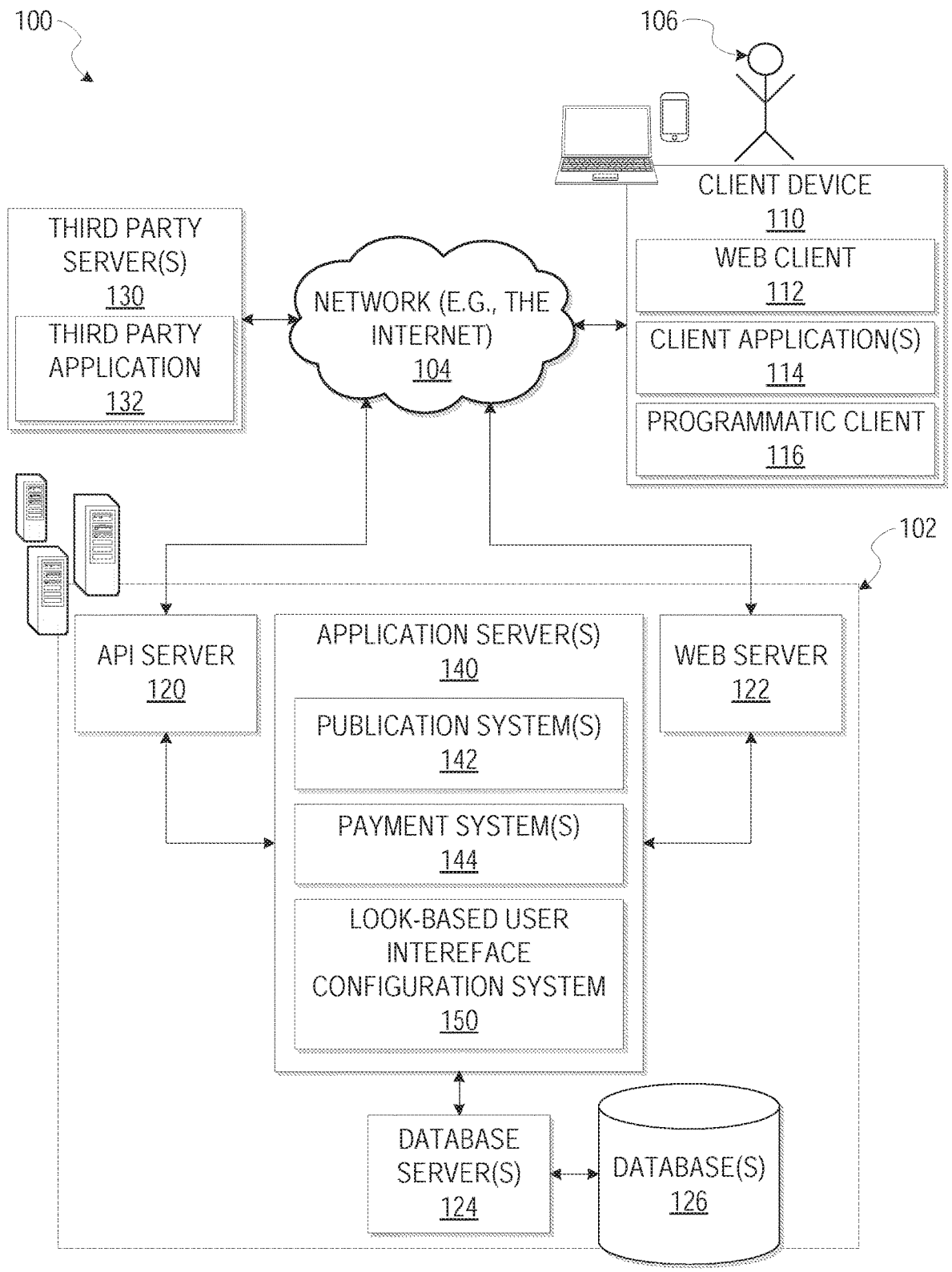
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a user interface is provided that allows a user to shop a "look" while browsing through items. Specifically, a particular look of an image can be quantified and used to retrieve additional items containing that look or matching the look. The image can either be explicitly specified by the user (e.g., by the user clicking on an image) or may be deduced based on usage behavior (e.g., based on past purchases or viewing habits). In this way, the user need not specify an exact search to retrieve items that may be relevant for browsing purposes, even in systems where a large number of items are available.

The term "look" as used in this disclosure shall be interpreted broadly to cover any visual characteristic of an image that can be utilized in recommending other products for viewing. Aspects such as color, pattern, shape, size, depth, orientation, lighting, etc. may be utilized in defining a look. In an example embodiment, other information may be utilized in conjunction with such visual aspects to help define a look. For example, a certain color and pattern in an image of a piece of furniture may represent a different look than that same color and pattern in a piece of clothing. In an example embodiment, this additional information about the category or type of item may be used in determining how to define the look. This additional information may be retrieved in a variety of ways, including by examining data or metadata for the item or the underlying image of the item.

In an example embodiment, a "shop the look" feature may be provided inside an ecommerce site itself. In such an embodiment, the user may be browsing items on the ecommerce site and be presented with items that contain the same look as items previously viewed or purchased, or items that the user explicitly selects to be used by the "shop the look" feature, such as by clicking on the item and selecting an option to shop the look of the item.

In another example embodiment, the "shop the look" feature may be provided outside of an ecommerce site itself (or, at least, outside of the ecommerce site selling the item). The "shop the look" feature may be presented on one or more third party systems and integrated with third party sites, allowing a user of a third party site to view items from the ecommerce site in response to the identification of relevant content on the third party site.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The look-based user interface configuration system 150 may provide functionality that configures a user interface based on the look of items. For example, the look-based user interface configuration system 150 may access the item information from the databases 126, the third party servers 130, the publication system 120, and other sources. In some example embodiments, the look-based user interface configuration system 150 may analyze the items to configure a user interface based on the look of items. In an alternative embodiment, the look-based user interface configuration system 150 may be a part of the client device 110, specifically as part of the web client 112, client application(s) and/or programmatic client 116.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and look-based user interface configuration system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
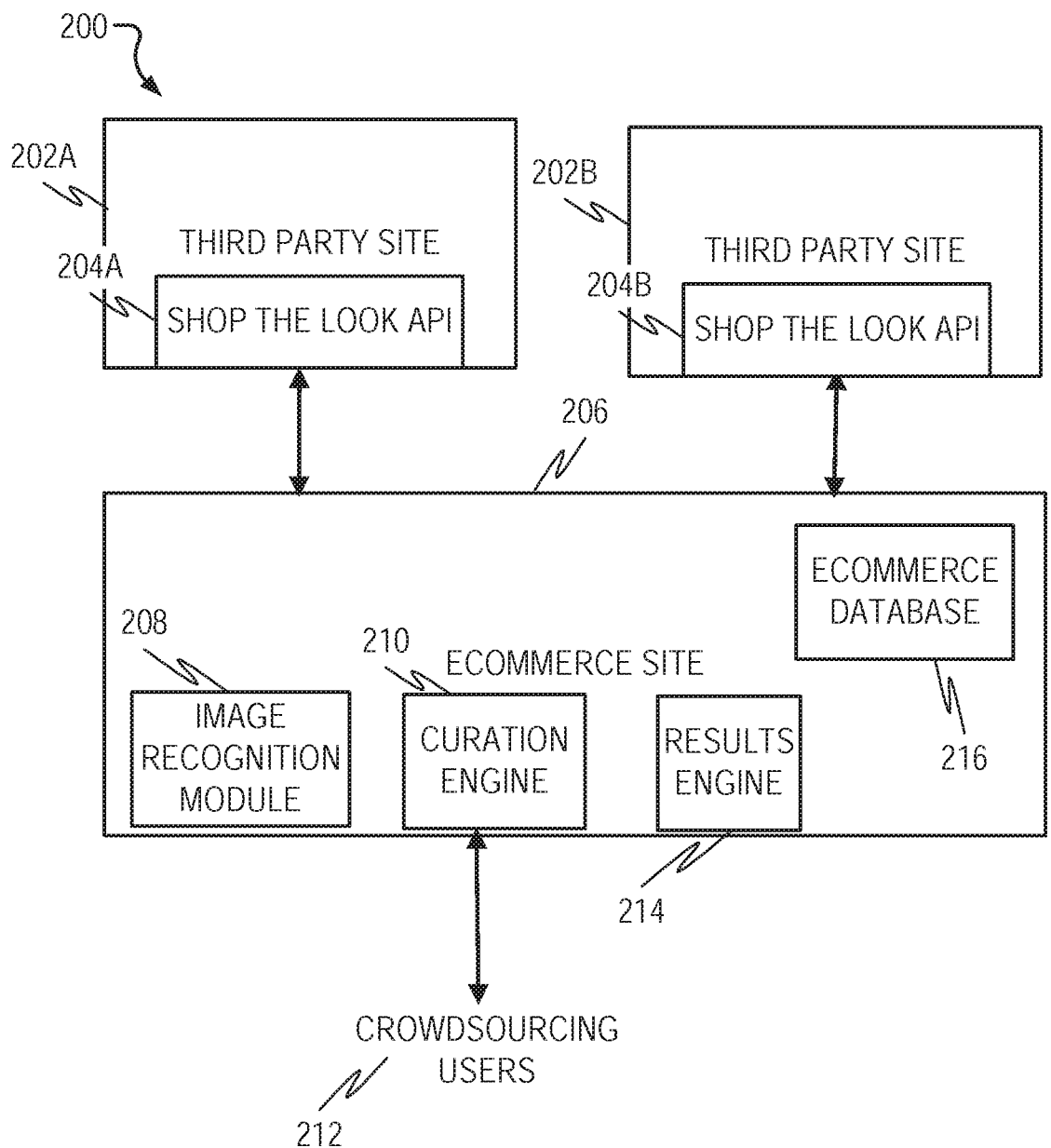
FIG. 2 is a block diagram illustrating a system in accordance with an example embodiment.

FIG. 2 is a block diagram illustrating a system 200 in accordance with an example embodiment. One or more third party sites 202A, 202B may each contain a shop the look API 204A, 204B that permits content from the third party site to be used as a basis for browsing items from the ecommerce site 206 while the user's browser is on the respective third party site 202A, 202B. An image recognition module 208 may perform image recognition on selected or otherwise identified images from the third party site 202A, 202B to help identify a classification for an item in the image. A curation engine 210 may utilize automatically determined information (e.g., from the image recognition module 208) and/or crowdsourcing (e.g., using crowdsourcing users 212) to identify the look of an image. This look may then be utilized with a results engine 214 to retrieve one or more items stored in the ecommerce database 216. These items could then be returned to the respective shop the look API 204A, 204B for display on a respective third party site 202A, 202B. The user can then purchase the item or items through the shop the look API 204A, 204B.

In an example embodiment, a curation engine 210 may be provided to determine which "look" in which a particular image belongs. The curation engine may be a combination of automatic processes for image recognition and classification and crowdsourcing, where the items "look" can be confirmed or denied by other users. A learning engine (not pictured) may be utilized to provide for machine learning of the "looks" of various item images and to improve on the recognition analysis.

In a first pass, natural language processing and image analysis may be utilized together to make an automatic classification of an item. In a second pass the results may then be crowdsourced for verification. In another example embodiment, in a third pass the crowdsourced results could be sent to the ecommerce site and an item search based on the results may then itself be crowdsourced for further verification.

Figure 3:
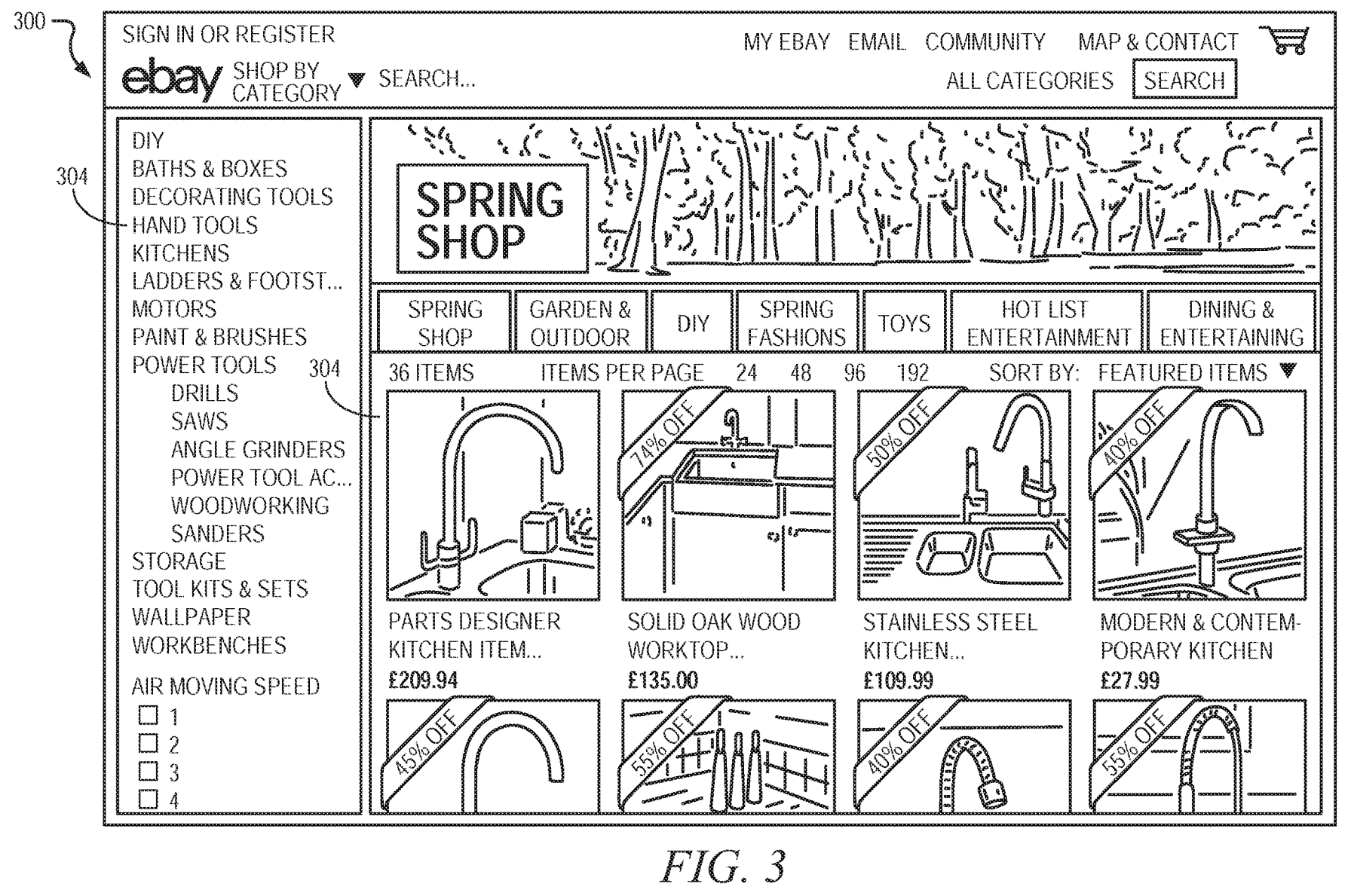

As described above, in an example embodiment a user interface is provided that provides a user with the ability to organize items by look. This process begins by displaying a set of items to a user in the user interface. FIG. 3 is a screen capture illustrating a first screen 300 of a user interface in accordance with an example embodiment. Here, the user has selected to display items from a "Spring Shop". The items are displayed in item display area 302. One or more dynamic filters 304 are displayed in the user interface as well. These filters 304 further define items shown in a browsing aspect for the look. The filters 304 may be dynamic, in that as the user selects or deselects them the corresponding images appearing on the screen of relevant items automatically updates in the item display area 302.

Figure 4:
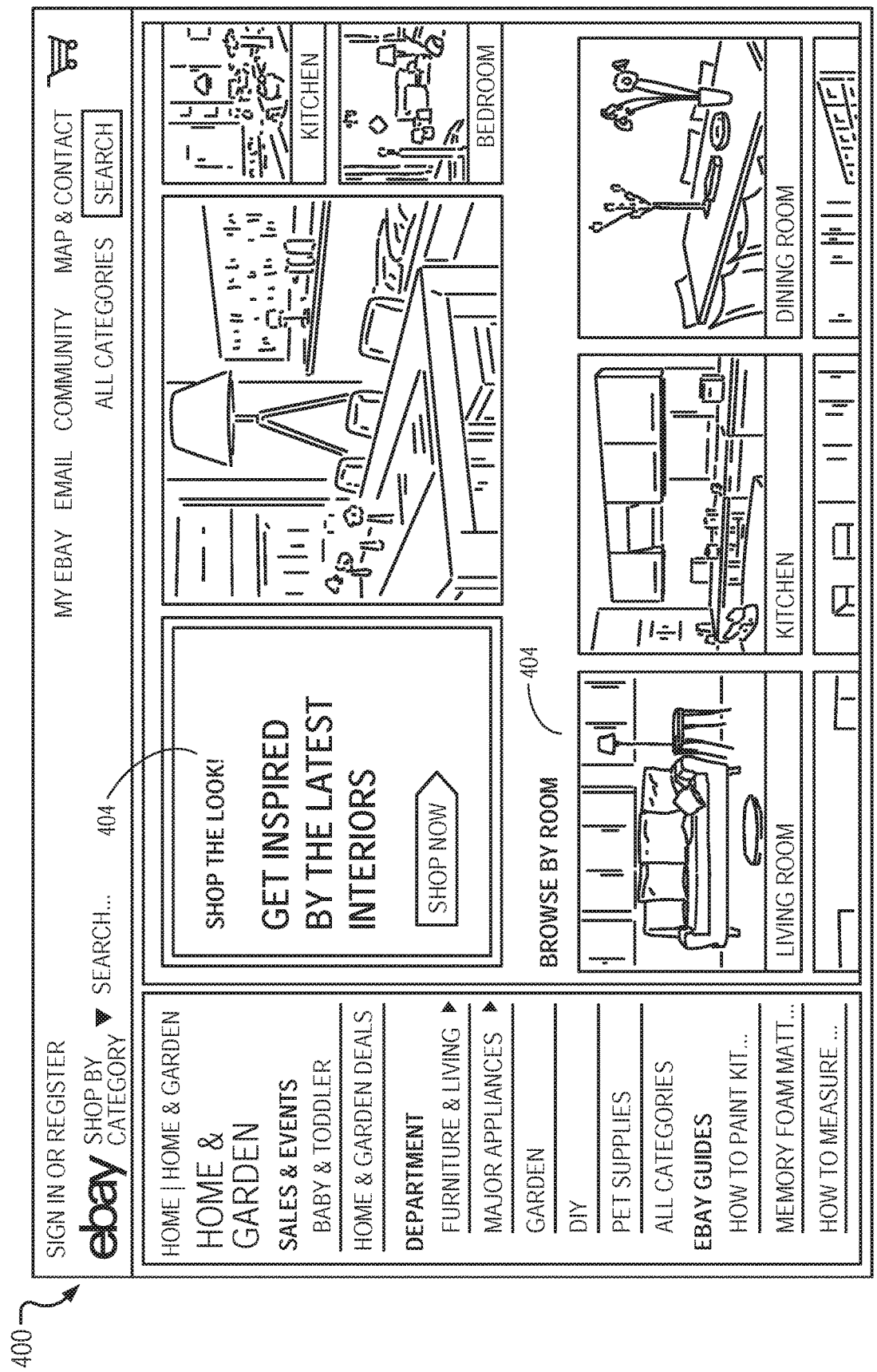
FIG. 4 is a screen capture illustrating a second screen of the user interface in accordance with an example embodiment.

At some point in the browsing process, the user interface may be configured to provide the ability for the user to elect to shop the look. FIG. 4 is a screen capture illustrating a second screen 400 of the user interface in accordance with an example embodiment. Here, the user is already able to view selected items by category, specifically by browsing the room, in category display area 402. However, a banner 404 is provided that urges the user to elect to shop the look. Selection of this banner 404 may then cause the system to reconfigure the user interface to a shop the look mode.

Figure 5:
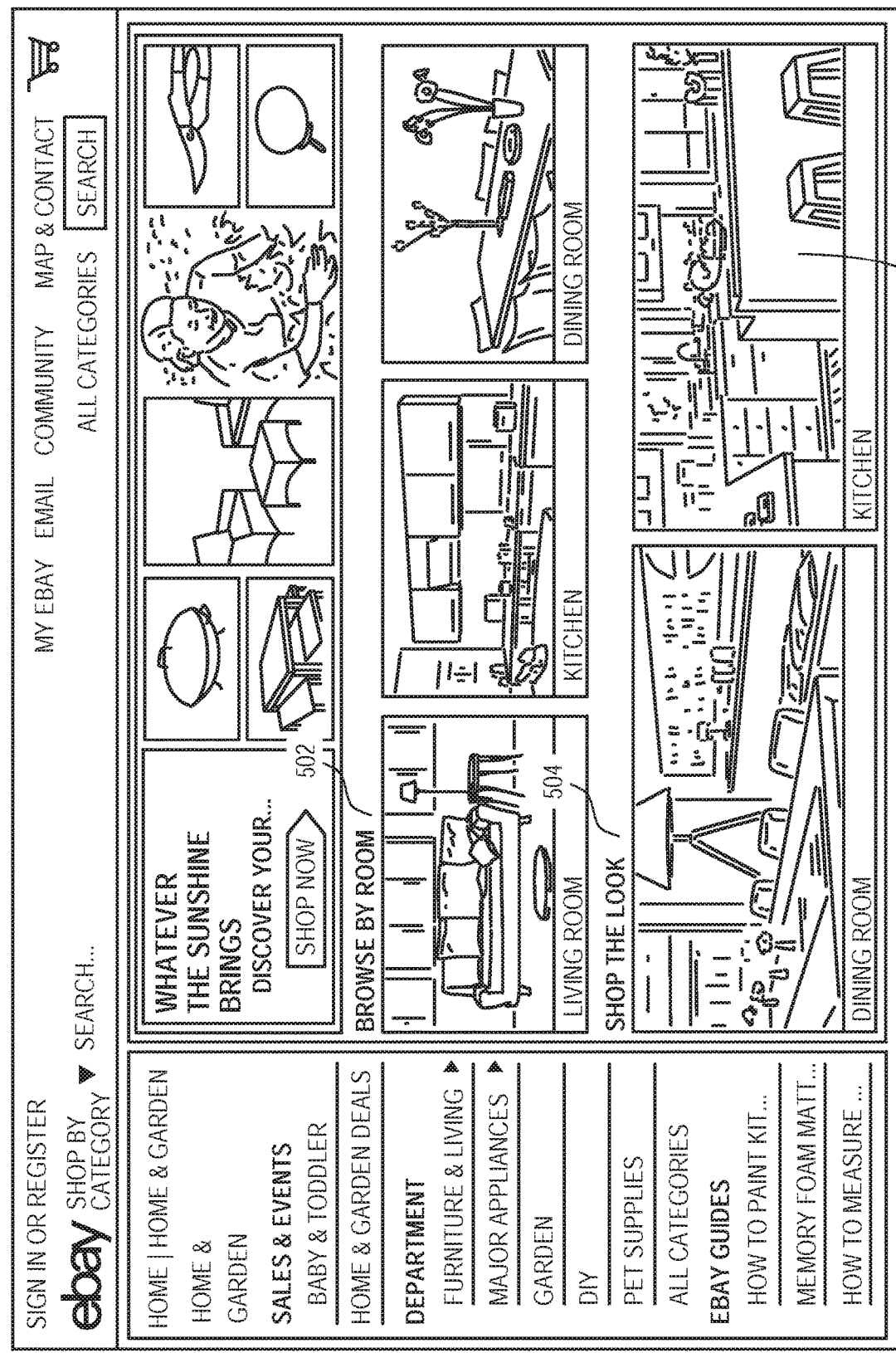
FIG. 5 is a screen capture illustrating a third screen of the user interface in accordance with an example embodiment.

FIG. 5 is a screen capture illustrating a third screen 500 of the user interface in accordance with an example embodiment. Here, the third screen 500 is divided into a category display area 502 and a shop the look area 504. The third screen 500 represents a screen that follows after the user selects banner 404 in the second screen 400 of FIG. 4. It should be noted that in the shop the look area 504 in this example embodiment the items are still categorized by the same categories that are displayed in category display area 502. The items depicted upon selecting the categories in the shop the look area 504 are only those that match a particular look. Different categories of shop the look items, such as bedroom category 506, are displayed.

Figure 6:
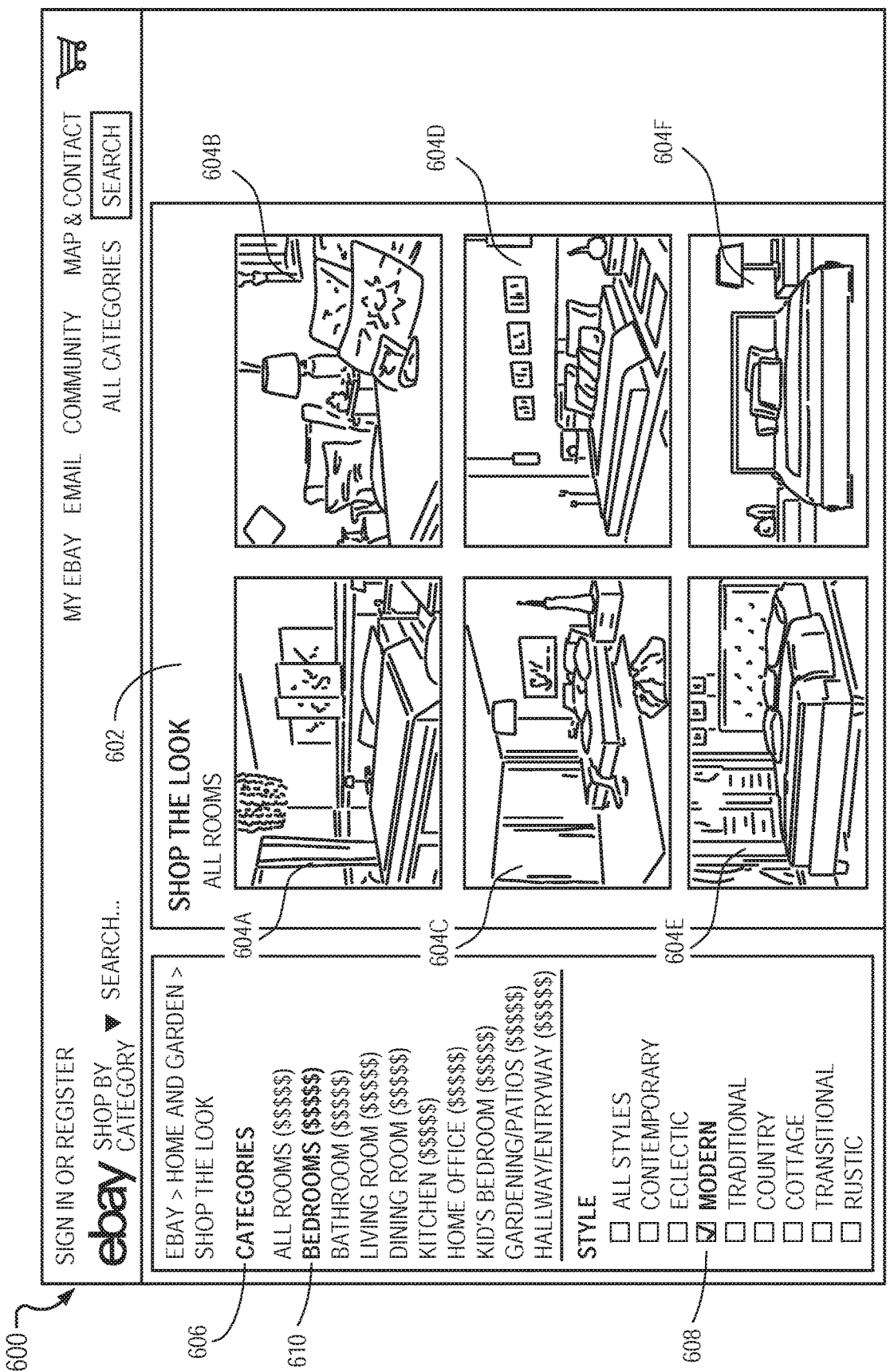
FIG. 6 is a screen capture illustrating a fourth screen of the user interface in accordance with an example embodiment.

FIG. 6 is a screen capture illustrating a fourth screen 600 of the user interface in accordance with an example embodiment. Here, the user has selected on the bedroom category 506 in the shop the look area 504 of FIG. 5. The result is that the category display area 502 has been removed and an updated shop the look area 602 is displayed. This updated shop the look area 602 displays items 604A-604F representing different looks, corresponding to the filters 606 selected by the user. Here, for example, the user has selected a "style" of "modern" using filter 608. The result is that each item 604A-604F displayed in the updated shop the look area 602 represents a different look within the style of modern. Of course, the user had previously clicked on the bedroom category 506 of the shop the look area 504 of FIG. 5, and thus the bedroom filter 610 is also selected, resulting in each of the items 604A-604F displayed in the updated shop the look area 602 displaying an item in a bedroom.

Selecting one of the items 604A-604F displayed in the updated shop the look area 602 causes the system to reconfigure the user interface to depict items that match the look of the selected item 604A-604F. The details of how this operation is performed are described in more detail below.

Figure 7:
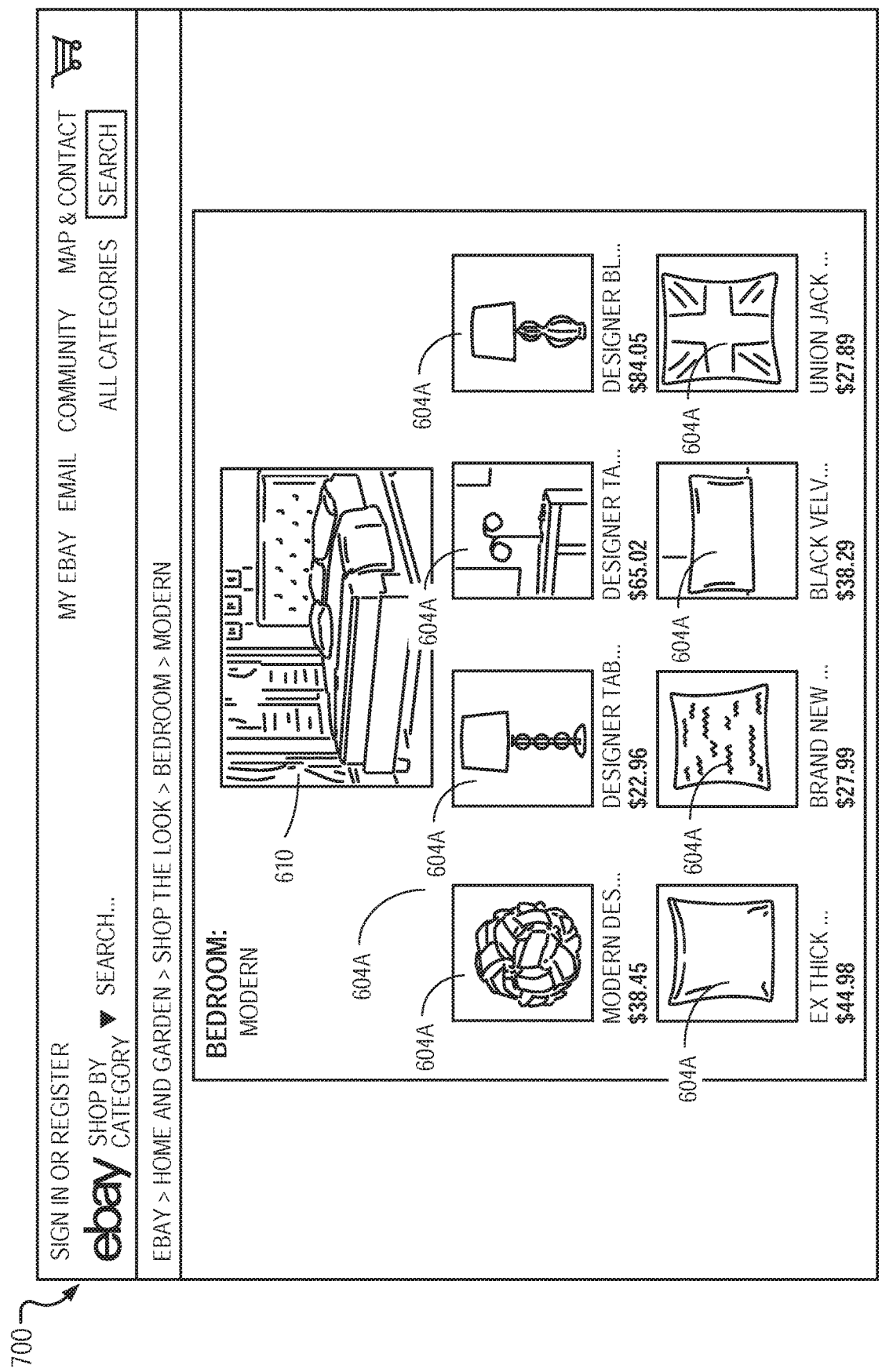
FIG. 7 is a screen capture illustrating a fifth screen of the user interface in accordance with an example embodiment.

FIG. 7 is a screen capture illustrating a fifth screen 700 of the user interface in accordance with an example embodiment. The updated shop the look area 602 is replaced with an item display area 702. Here, the user selected on item 604E in FIG. 6, causing the items 704A-704H to be displayed in item display area 702 to be those that match the same look as the selected item 604E, which is also displayed on the fifth screen 700 to allow the user a reference point for the items 704A-704H.

The screen captures depicted in FIGS. 3-7 represent a user interface presented in a web browser or other direct access to an ecommerce portal where the actual items 704A-704H are sold. In another example embodiment, the "shop the look" feature is integrated into a third party site that does not actually sell the items. Here, the third party is not an ecommerce provider but merely an online content provider, such as one that provides articles about home items (and photos of such items). The browser interface and/or the site may be designed in a manner that allows the user to see items from an ecommerce site that are of the same look as the item(s) depicted in the photos.

Figure 8:
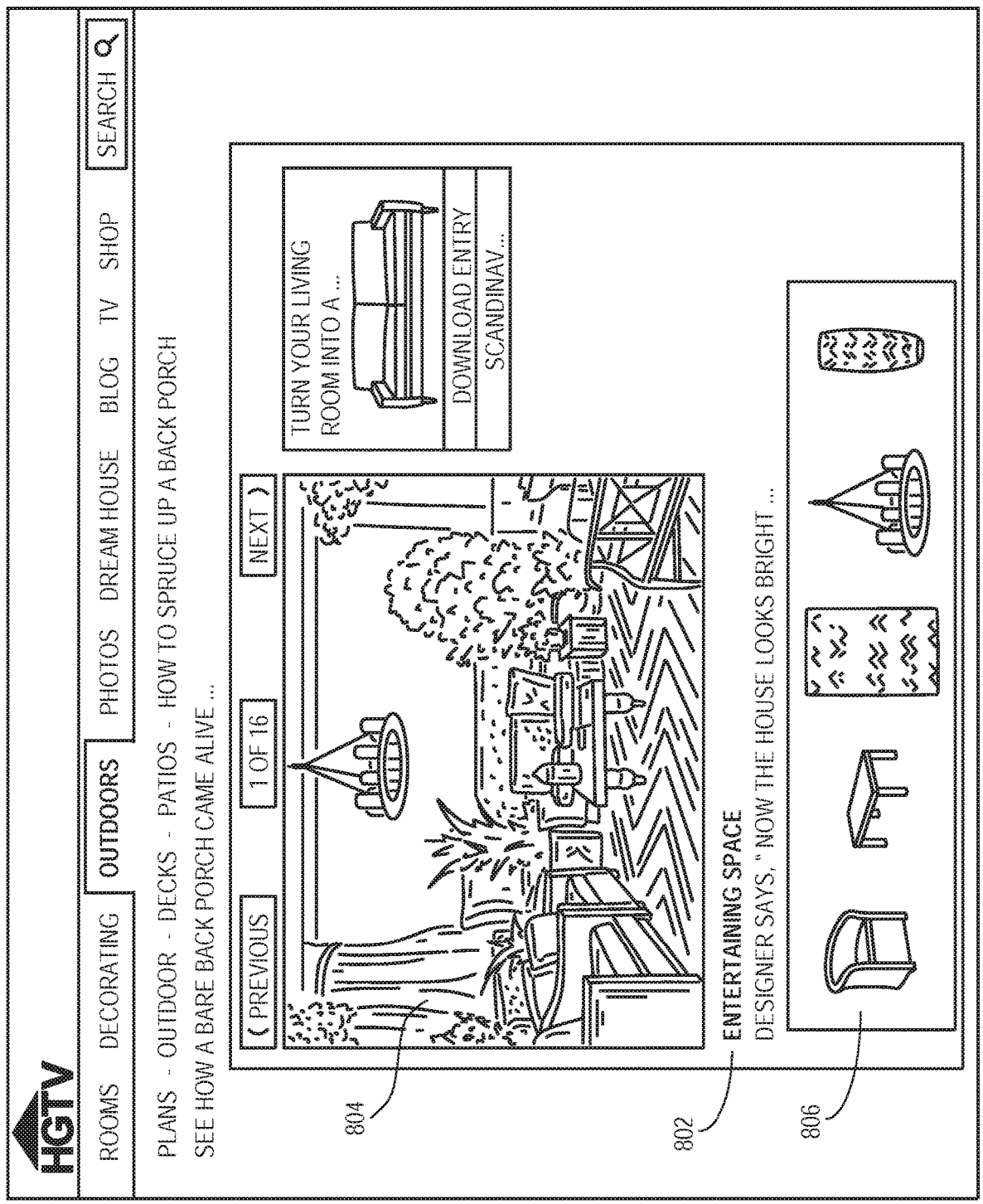
FIG. 8 is a screen capture illustrating a first screen of a user interface in accordance with another example embodiment.

FIG. 8 is a screen capture illustrating a first screen 800 of a user interface in accordance with another example embodiment. Here, the user interface is provided by a third-party that does not directly sell items. A content area 802 depicts content that depicts, describes, or in some other way relates to a look. Here the content area 802 depicts an article that includes an image 804. A "look" for the image can be determined by the system, which can then provide a "shop the look" area 806, which depicts a sampling of items for sale having a similar look to the items in the image 804. Selection of this shop the look area 806 can launch a "shop the look screen".

Figure 9:
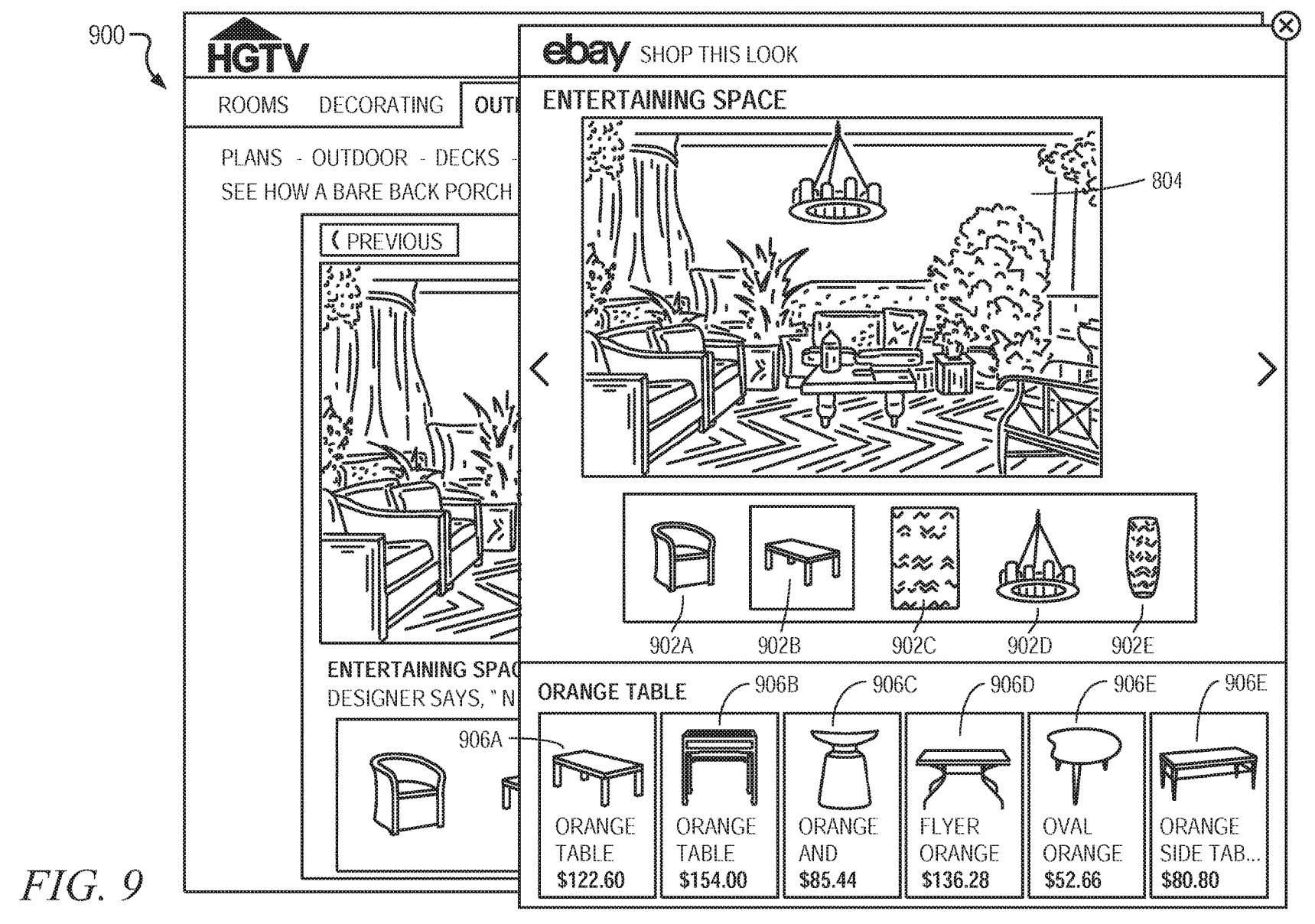

FIG. 9 is a screen capture illustrating a second screen 900 of a user interface in accordance with another example embodiment. Here, the second screen 900 depicts a shop the look screen that include, for reference, the image 804 along with various items 902A-902E matching the look of the image that are for sale by the separate ecommerce service. A user interface is also provide that allows the user to select on one of the items 902A-902E and select alternative items of that type that still match the look of the image 804. For example, in this case the user has selected table 902B. Depicted in item area 904 are a number of different tables 906A-906F that are also for sale by the separate ecommerce service and that also match the look of the image 804. This allows the user to select from tables that coordinate well with whatever look the image 804 represents. This not only provides a mechanism by which a user can more easily focus on items that match particular desired looks, but also can aid users who don't actually know much about coordination of looks in selecting an item. For example, a user may not know the exact look of the image 804, but may know they like it, although they may not like table 902B. This way, the user can be presented with alternative tables that still match the look of the image without the user needing to have any knowledge of what that look actually is. This is in contrast to the prior art, where if a user desires items matching a certain look, he or she must be able to identify what that look is and specify it in a search or filter (e.g., "mid-century modern").

Notably, second screen 900 has been displayed without the user having navigated away from the third party website. Indeed, through various APIs it is possible for the user to browse items available for sale on an ecommerce service, select, and purchase those items all without actually navigating to the ecommerce service or otherwise navigating away from the third party website he or she is visiting.

Figure 10:
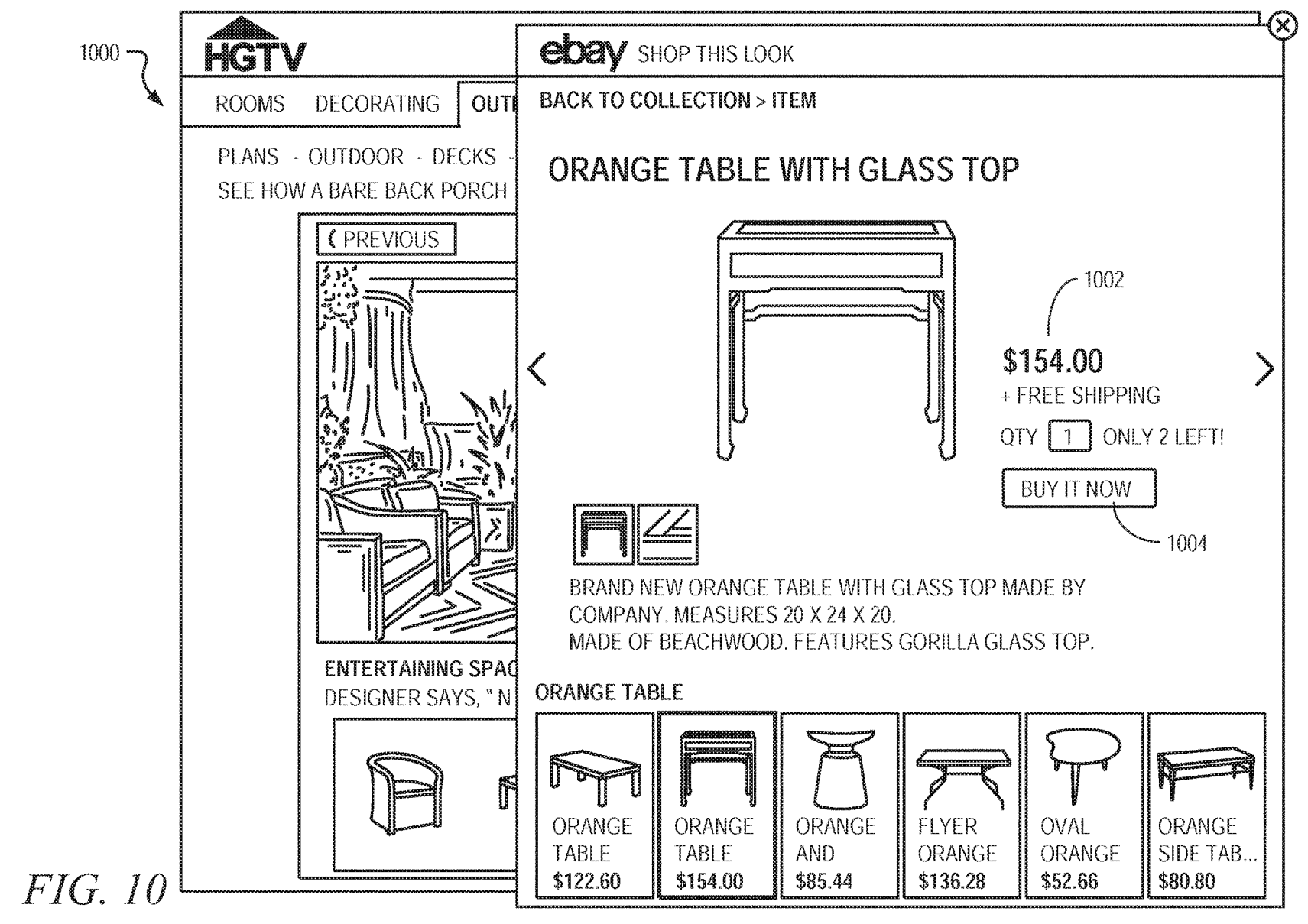
Figure 11:
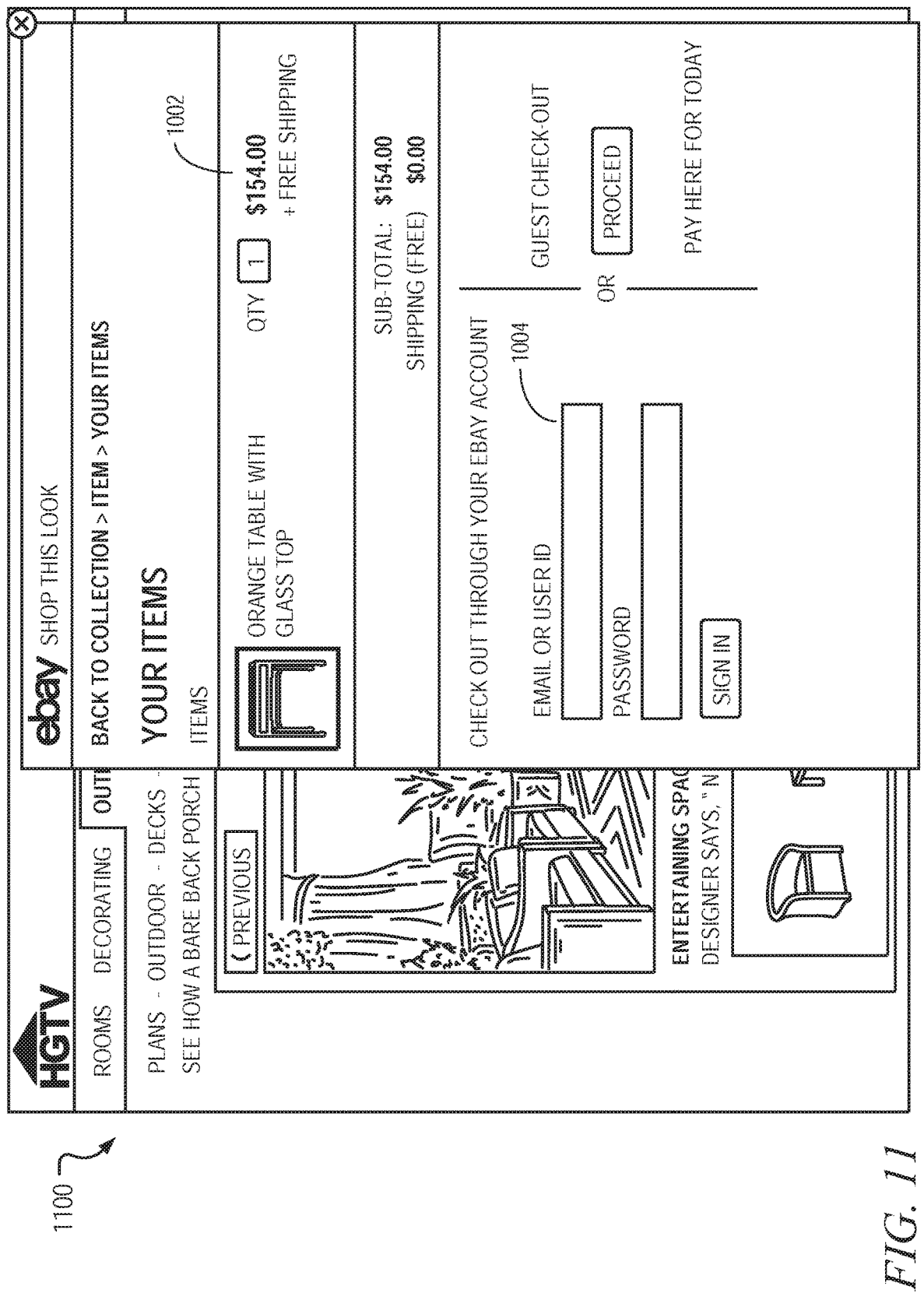
FIG. 11 is a screen capture illustrating a checkout page in accordance with another example embodiment.
Figure 12:
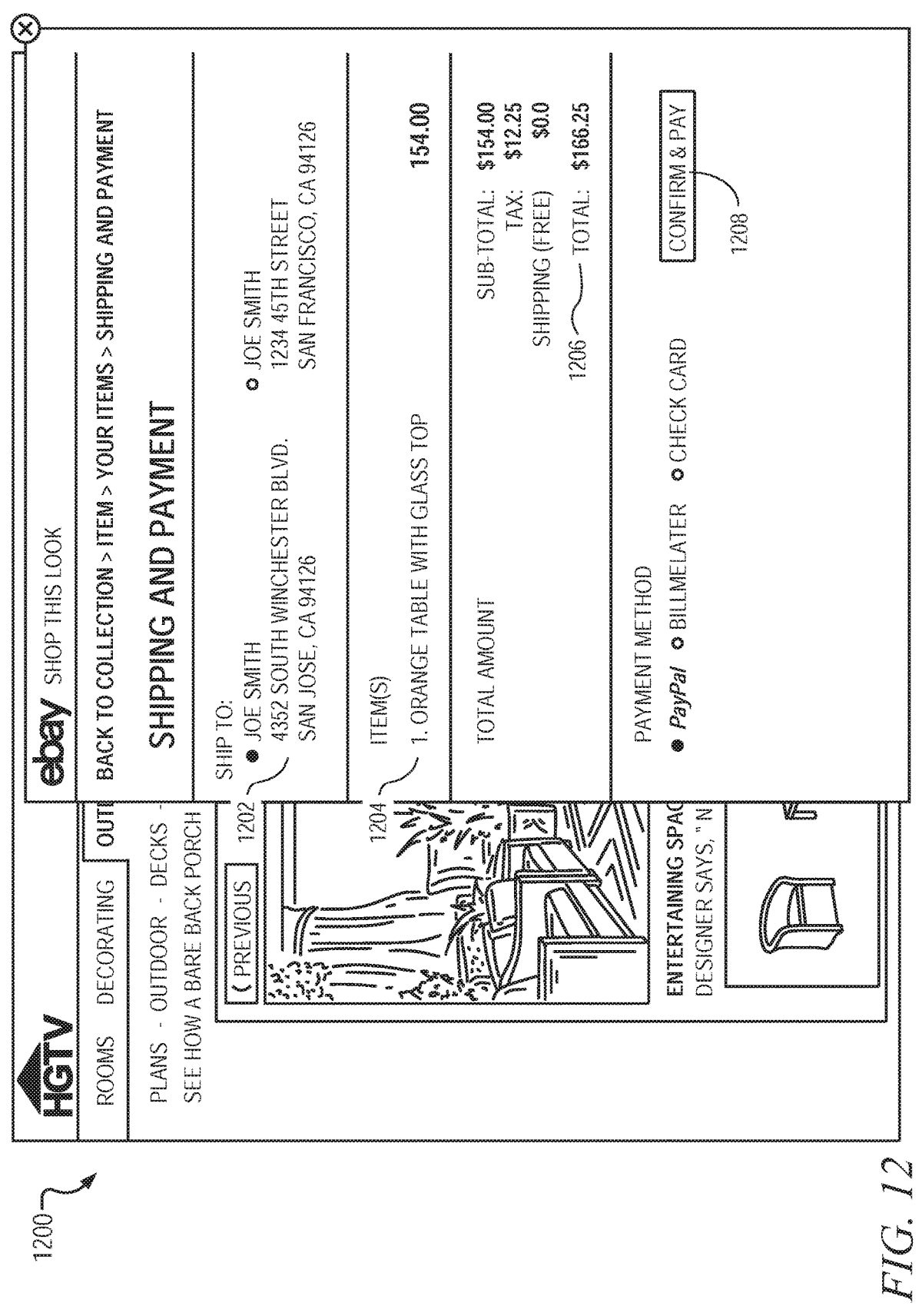

FIG. 10-12 are screen captures illustrating aspects of the checkout process that may all be accomplished without the user navigating away from the third party website. FIG. 10 is a screen capture illustrating an item page 1000 in accordance with another example embodiment. Here, the purchase details such as price 1002 are displayed for the user, and the user can select on a button 1004 to purchase the item.

FIG. 11 is a screen capture illustrating a checkout page 1100 in accordance with another example embodiment. Here, the user is provided with a total 1102 for the purchase as well as a mechanism to log-in 1104 to an account if desired.

FIG. 12 is a screen capture illustrating a final payment page 1200 in accordance with another example embodiment. Here, the user is presented with all the final details of the order, including a ship to address 1202, item listing 1204, total price 1206, and a confirmation button 1208. Selection of the confirmation button 1208 causes completion of the order with the ecommerce service, all without having directly navigating to the ecommerce service, or indeed navigating away from the third party website at all.

Notably, as can be seen above, an Application Program Interface (API) is provided that provides the user with the ability to select and purchase an item from the third party site, even though the third party site is not executing the transaction or otherwise involved with the sale of the item. Thus, a user is able to purchase an item from an ecommerce site through the third party site without visiting the ecommerce site directly, and without the third party site hosting item information or conducting payment transactions.

In another example embodiment, the "browse the look" feature could be persisted across multiple third party sites. Specifically, a shopping cart may be provided that items from the browse the look feature on a first third party site could be added. The user could then navigate to a second third party site and have the items remain in the shopping cart, as well as potentially add to the shopping cart with items displayed due to content being viewed on the second third party site.

In another example embodiment, the items displayed to users as part of the "shop the look" interface may be different based on the device type. Factors such as price, type of item, terms of service/shipping, and urgency of the item (e.g., when an auction for the item ends, or a sale ends) may be used in determining whether a particular item should be part of the "look" results displayed to a particular device of the user. For example, urgent items may be more likely to be served to a user when the user is on a smartphone than when he or she is on a desktop computer.

Determination of whether an image matches a particular look may be performed using specialized look recognition algorithm. In this look recognition algorithm, objects within an image may be identified and used to compare against a database of looks stored in a look database. The object identification may be performed in a number of different ways. In one example embodiment, objects within an image may be identified using an image recognition process where first objects within the image are delineated and then second each of these objects is compared to a database of known objects to identify the objects within the image. In another example embodiment, metadata within the image may identify one or more objects in the image without the need for image recognition to be performed.

Once the objects within the image are identified, visual characteristics of the objects may be extracted. The particular visual characteristics extracted may depend on the visual characteristics that a developer has identified as being relevant to distinguishing looks. Examples of visual characteristics that can be extracted include color, shape, style, angle, lighting, shading, pattern, material, etc. In an example embodiment, a database of specific visual cues can also be used to identify particular elements relevant to particular looks. For example, the style of "modern" furniture is typically delineated by simple lines and smooth surfaces. Thus, a database of example simple lines and smooth surfaces may be maintained and used to identify modern furniture objects in images. The various visual characteristics themselves can be compared with visual characteristics defining the look, perhaps accentuated by the identification of the aforementioned specific visual cues. The result is a look comparison score that estimates the similarity between the particular object and the look. This may be repeated for each look in the look database. The look that has the highest look comparison score for the particular object may be deemed to be the matching look for the object. This is helpful in that there may be instances where an object may fit into multiple different looks. By taking the look with the highest look comparison score, the "best" match is selected, in spite of the fact that there may indeed be multiple "matches" for the object.

Of course, an image may actually contain more than one object. In cases where the image contains more than one object, the look comparison score may be calculated for each of the objects in the image against each look in the look database. For each look, the look comparison scores for each of the objects in the image may be aggregated (e.g., by averaging them) to arrive at an aggregated look comparison score for the look/image combination. As with the single object use case, the look having the highest aggregated look comparison score for the image is deemed to be the matching look for the image.

Once the matching look has been identified, the identified look can be compared with one or more item listings stored in a database to identify one or more matching item listings. This comparison may be performed by performing something similar to the inverse of the comparison made during the identification of the look. Specifically, each of the one or more item listings may contain one or more images. The system can identify images within these one or more images that best resemble the look, again looking at visual characteristics of objects in the images much like the visual characteristics of objects within the selected image were examined to identify the look in the first place. Once again, a look comparison score may be calculated for each of these images, and the item or items having images with the highest look comparison scores may be selected as the items most closely matching the look. Of course, there may be a number of different filters selected or applied to the item listings, which may narrow the field of results from which the matches can be selected. For example, a user may have selected "table" as a filter, which may limit the search results to only selecting tables matching the look.

Nevertheless, once the one or more matching item listings are identified, they may be displayed in the user interface for selection and/or purchase.

Figure 13:
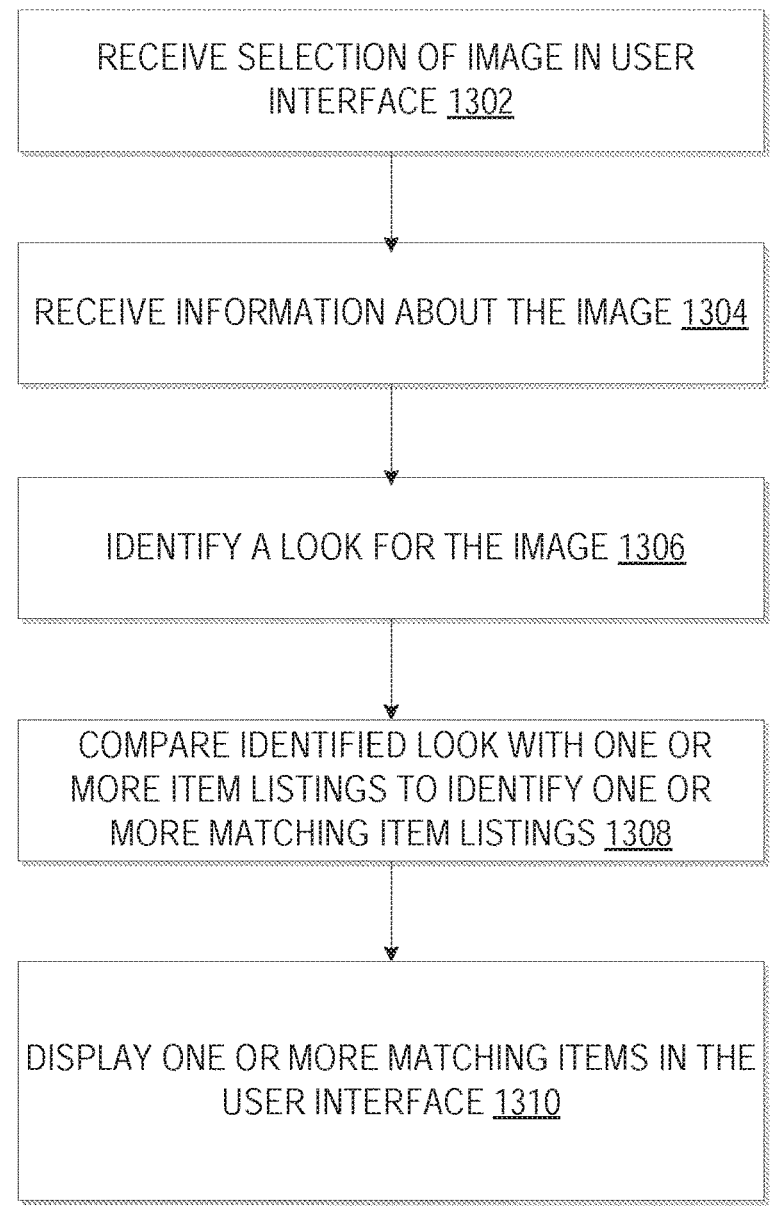
FIG. 13 is a flow diagram illustrating a method in accordance with an example embodiment.

FIG. 13 is a flow diagram illustrating a method 1300 in accordance with an example embodiment. At operation 1302, a selection of an image in a user interface may be received. This selection may be indicated in a number of different ways. In one example embodiment, a user may explicitly select an image previously displayed in a user interface, such as on a web page operated by an ecommerce service or embedded in content offered by a third party not selling items. In another example embodiment, this selection may be implied through other user actions, such as the user requesting a certain type of object and the system selecting an object with a particular image as being a close match based on the user request.

At operation 1304, information may be received about the image. This information may be obtained in a number of different ways. In one example embodiment, this information may be obtained using an image recognition process, as described in more detail above. In another example embodiment, this information may be obtained using metadata embedded with the image.

At operation 1306, a look for the image is identified. This look may be identified by, for example, calculating a look comparison score between each object in the image to a look defined in a look database, based on one or more visual characteristics of the objects, as described in more detail above.

At operation 1308, the identified look is compared with one or more item listings stored in a database to identify one or more matching item listings, the one or more matching item listings containing associated images that correspond to the look. As described above, this may be performed by using a look comparison score between each object in each images for a plurality of item listings as compared to the look, and taking the items listings having the highest look comparison scores (and/or aggregated look comparison scores for items with multiple images and/or multiple objects per image).

At operation 1310, the one or more matching items are displayed in the user interface.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-13 are implemented in some embodiments in the context of a machine (or multiple machines) and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 14:
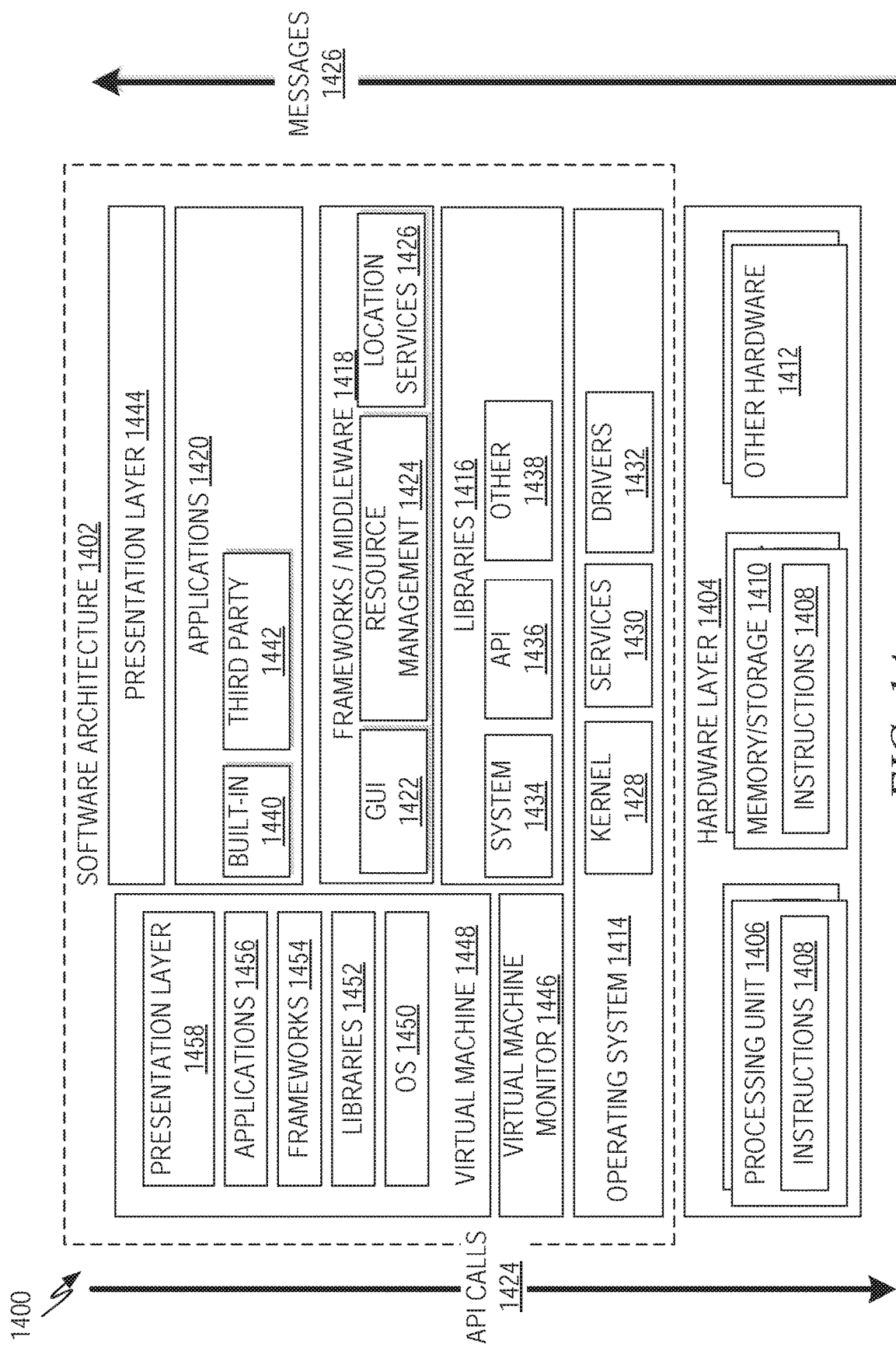
FIG. 14 is a block diagram illustrating an example of a software architecture that may be installed on a machine, according to some example embodiments.

FIG. 14 is a block diagram 1400 illustrating a representative software architecture 1402, which may be used in conjunction with various hardware architectures herein described. FIG. 14 is merely a non-limiting example of a software architecture and it will be appreciated that many other architectures may be implemented to facilitate the functionality described herein. The software architecture 1402 may be executing on hardware such as machine 1500 of FIG. 15 that includes, among other things, processors 1510, memory 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. Executable instructions 1408 represent the executable instructions of the software architecture 1402, including implementation of the methods, modules and so forth of FIGS. 1-15. Hardware layer 1404 also includes memory and/or storage modules 1410, which also have executable instructions 1408. Hardware layer 1404 may also comprise other hardware as indicated by 1412 which represents any other hardware of the hardware layer 1404, such as the other hardware illustrated as part of machine 1500.

In the example architecture of FIG. 14, the software 1402 may be conceptualized as a stack of layers where each layer provides particular functionality. For example, the software 1402 may include layers such as an operating system 1414, libraries 1416, frameworks/middleware 1418, applications 1420 and presentation layer 1422. Operationally, the applications 1420 and/or other components within the layers may invoke application programming interface (API) calls 1424 through the software stack and receive a response, returned values, and so forth illustrated as messages 1426 in response to the API calls 1424. The layers illustrated are representative in nature and not all software architectures have all layers. For example, some mobile or special purpose operating systems may not provide a frameworks/middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules. The API libraries 1436 may include various APIs that allow for communications between third party servers and ecommerce servers to allow for retrieval and display of items hosted by the ecommerce server on interfaces generated by the third party servers (either via web browsers or direct applications), as well as provide a mechanism for users to purchase items hosted on the ecommerce servers from the user interface generated by the third party servers without directly interfacing with the ecommerce server or navigating to a website generated by the ecommerce server.

The frameworks 1418 (also sometimes referred to as middleware) may provide a higher-level common infrastructure that may be utilized by the applications 1420 and/or other software components/modules. For example, the frameworks 1418 may provide various graphic user interface (GUI) functions 1422, high-level resource management 1424, high-level location services 1426, and so forth. The GUI functions 1422 may include the functionality described earlier with regards to generating and regenerating a user interface that allows the user to "shop the look." The frameworks 1418 may provide a broad spectrum of other APIs that may be utilized by the applications 1420 and/or other software components/modules, some of which may be specific to a particular operating system or platform.

The applications 1420 include built-in applications 1440 and/or third party applications 1442. Examples of representative built-in applications 1440 may include, but are not limited to, a contacts application, a browser application, a book reader application, a location application, a media application, a messaging application, and/or a game application. Third party applications 1442 may include any of the built in applications as well as a broad assortment of other applications. In a specific example, the third party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1442 may invoke the API calls 1424 provided by the mobile operating system such as operating system 1414 to facilitate functionality described herein.

The applications 1420 may utilize built in operating system functions (e.g., kernel 1428, services 1430 and/or drivers 1432), libraries (e.g., system 1434, APIs 1436, and other libraries 1438), frameworks/middleware 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the machine of FIG. 15, for example). A virtual machine is hosted by a host operating system (operating system 1414 in FIG. 15) and typically, although not always, has a virtual machine monitor 1446, which manages the operation of the virtual machine as well as the interface with the host operating system (i.e., operating system 1414). A software architecture executes within the virtual machine such as an operating system 1450, libraries 1452, frameworks/middleware 1454, applications 1456 and/or presentation layer 1458. These layers of software architecture executing within the virtual machine 1448 can be the same as corresponding layers previously described or may be different.

Example Machine Architecture and Machine-Readable Medium

Figure 15:
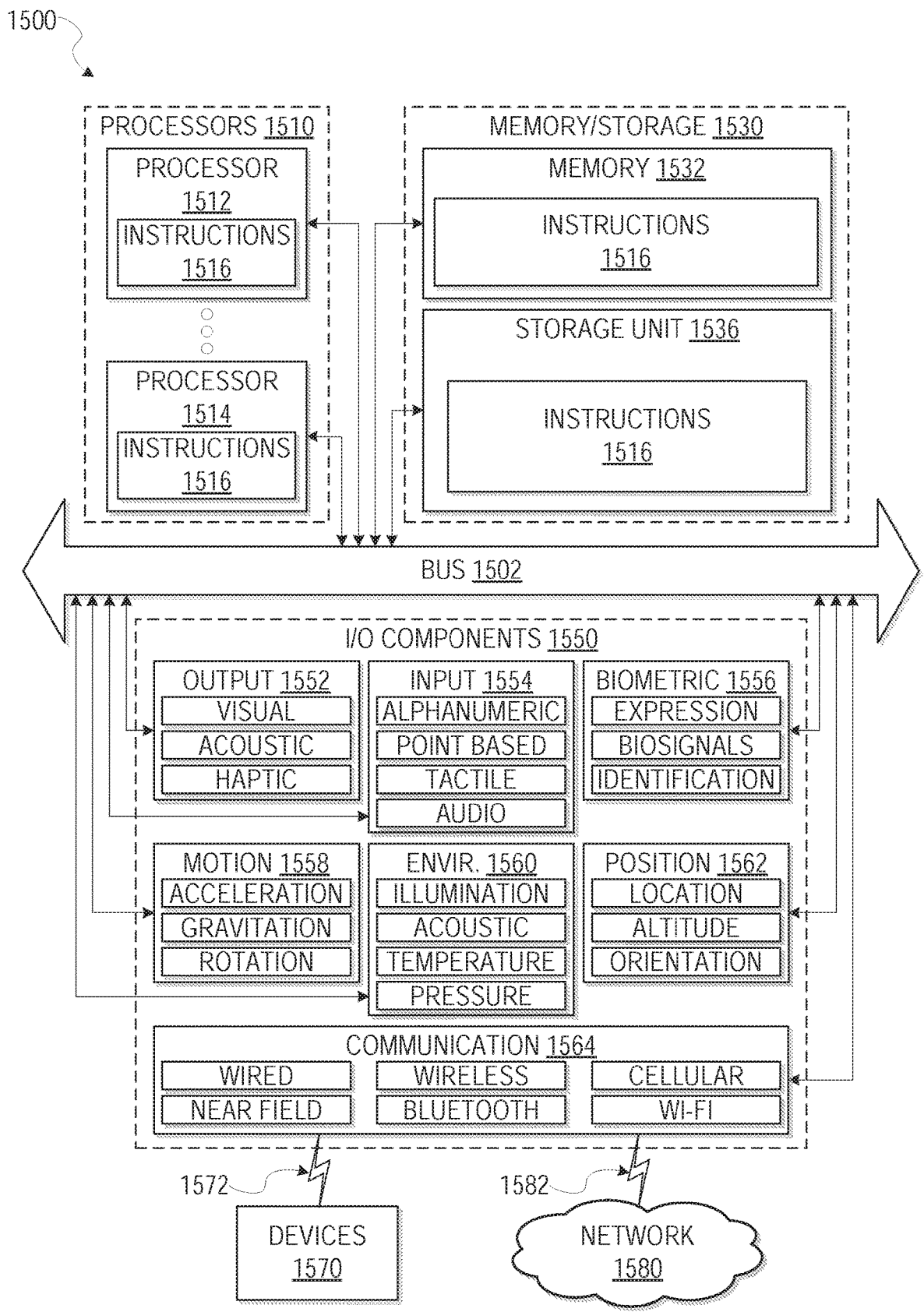
FIG. 15 illustrates a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions may cause the machine to execute the flow diagram of FIG. 13. Additionally, or alternatively, the instructions may implement the curation engine 210 of FIG. 2, and so forth. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1512 and processor 1514 that may execute instructions 1516. The term "processor" is intended to include multi-core processor that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core process), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572 respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus comprising:
one or more hardware processors;
memory storing computer program instructions executable by the one or more hardware processors; and
a user interface configuration system configured to utilize the one or more hardware processors to perform operations comprising:
causing presentation of a user interface configured to browse an electronic catalog of listings;
upon receiving a selection, in the user interface, of a banner visualizing an option to browse the electronic catalog based on distinguishing styles, reconfiguring the user interface to a style browsing mode displaying product images from the electronic catalog that are selectable to (a) identify a distinguishing style and (b) search based on the distinguishing style, the style browsing mode configured to:
receive a selection of an image of the product images;
trigger a curation engine to (i) automatically identify the distinguishing style of a product in the image based on one or more visual characteristics of the product using at least one of image recognition, automatic classification, or crowdsourcing, and (ii) identify, from the electronic catalog, matching listings containing images of products having styles that match the distinguishing style of the product;
receive, from the curation engine, a representation of the matching listings; and
cause presentation of the matching listings in the user interface.

2. The apparatus of claim 1, wherein the curation engine is configured to automatically identify the distinguishing style for the image by automatically classifying the product in the image based on an image recognition analysis comparing the one or more visual characteristics of the product in the image to visual cues for defined styles.

3. The apparatus of claim 2, wherein the curation engine is configured to automatically classify the product in the image based on a combination of natural language processing together with the image recognition analysis.

4. The apparatus of claim 2, wherein the curation engine is configured to automatically classify the product in the image based on a crowdsourced verification.

5. The apparatus of claim 1, wherein the curation engine is configured to automatically identify the distinguishing style for the image by calculating a look comparison score between each of a plurality of objects in the image, including the product, and one or more looks in a look database, aggregating the look comparison score for each of the plurality of objects, and selecting as the distinguishing style a look in the look database having the highest aggregated look comparison score for the objects.

6. The apparatus of claim 1, wherein the curation engine is configured to extract the one or more visual characteristics comprising a defined distinguishing combination of at least one of color, shape, style, angle, lighting, shading, pattern, or material corresponding to the distinguishing style.

7. The apparatus of claim 1, wherein the curation engine is configured to receive the selection of the image via an application program interface (API) from a third party server, distinct from the curation engine, the curation engine being of an ecommerce service, such that providing the matching listings for display in the user interface does not require the selection of the image to occur directly in a web site operated by the ecommerce service.

8. A method comprising:
causing presentation of a user interface configured to browse an electronic catalog of listings;
upon receiving a selection, in the user interface, of a banner visualizing an option to browse the electronic catalog based on distinguishing styles, reconfiguring the user interface to a style browsing mode displaying product images from the electronic catalog that are selectable to (a) identify a distinguishing style and (b) search based on the distinguishing style, the style browsing mode configured to:
receive a selection of an image of the product images;
trigger a curation engine to (i) automatically identify the distinguishing style of a product in the image based on one or more visual characteristics of the product using at least one of image recognition, automatic classification, or crowdsourcing, and (ii) identify, from the electronic catalog, matching listings containing images of products having styles that match the distinguishing style of the product;
receive, from the curation engine, a representation of the matching listings; and
cause presentation of the matching listings in the user interface.

9. The method of claim 8, wherein the curation engine is configured to automatically identify the distinguishing style for the image by automatically classifying the product in the image based on an image recognition analysis comparing the one or more visual characteristics of the product in the image to visual cues for defined styles.

10. The method of claim 9, wherein the curation engine is configured to automatically classify the product in the image based on a combination of natural language processing together with the image recognition analysis.

11. The method of claim 9, wherein the curation engine is further configured to automatically classify the product in the image based on a crowdsourced verification.

12. The method of claim 8, wherein the curation engine is configured to automatically identify the distinguishing style for the image by calculating a look comparison score between each of a plurality of objects in the image, including the product, and one or more looks in a look database, aggregating the look comparison score for each of the plurality of objects, and selecting as the distinguishing style a look in the look database having the highest aggregated look comparison score for the objects.

13. The method of claim 8, further comprising, while the user interface is in the style browsing mode:
causing presentation of a set of images, each depicting a collection, wherein the selection of the image is from the set of images, leaving a remaining set of the images; and upon receiving the matching listings having the styles that match the distinguishing style of the image, reconfiguring the user interface to depict the matching listings and remove the remaining set of the images.

14. The method of claim 8, wherein the selection of the image is received via an application program interface (API) from a third party server, and wherein the curation engine is executed on an ecommerce server of an ecommerce service, the ecommerce server being separate and distinct from the third party server, such that providing the matching listings for display in the user interface does not require the selection of the image to occur directly in a web site operated by the ecommerce service.

15. A non-transitory machine-readable storage medium comprising instructions, which when implemented by one or more machines, cause the one or more machines to perform operations comprising:
   causing presentation of a user interface configured to browse an electronic catalog of listings;
   upon receiving a selection, in the user interface, of a banner visualizing an option to browse the electronic catalog based on distinguishing styles, reconfiguring the user interface to a style browsing mode displaying product images from the electronic catalog that are selectable to (a) identify a distinguishing style and (b) search based on the distinguishing style, the style browsing mode configured to:
      receive a selection of an image of the product images;
      trigger a curation engine to (i) automatically identify the distinguishing style of a product in the image based on one or more visual characteristics of the product using at least one of image recognition, automatic classification, or crowdsourcing, and (ii) identify, from the electronic catalog, matching listings containing images of products having styles that match the distinguishing style of the product;
      receive, from the curation engine, a representation of the matching listings; and
      cause presentation of the matching listings in the user interface.

16. The non-transitory machine-readable storage medium of claim 15, wherein the curation engine is configured to automatically identify the distinguishing style for the image by automatically classifying the product in the image based on an image recognition analysis comparing the one or more visual characteristics of the product in the image to visual cues for defined styles.

17. The non-transitory machine-readable storage medium of claim 16, wherein the curation engine is configured to automatically classify the product in the image based on a combination of natural language processing together with the image recognition analysis.

18. The non-transitory machine-readable storage medium of claim 16, wherein the curation engine is further configured to automatically classify the product in the image based on a crowdsourced verification.

19. The non-transitory machine-readable storage medium of claim 15, wherein the curation engine is configured to extract the one or more visual characteristics comprising a defined distinguishing combination of at least one of color, shape, style, angle, lighting, shading, pattern, or material corresponding to the distinguishing style.

20. The non-transitory machine-readable storage medium of claim 15, wherein the selection of the image is via an application program interface (API) from a third party server, and wherein the curation engine resides on an ecommerce server of an ecommerce service, the ecommerce server being separate and distinct from the third party server, such that providing the matching listings for display in the user interface does not require the selection of the image to occur directly in a web site operated by the ecommerce service.

* * * * *